United States Patent
Kanbayashi et al.

[11] Patent Number: 5,903,783
[45] Date of Patent: May 11, 1999

[54] MOTION COMPENSATION DEVICE TO CONTROL A CENTERING OPERATION OF A MOTION COMPENSATION LENS

[75] Inventors: Hideki Kanbayashi; Yoshio Imura, both of Kawasaki, Japan

[73] Assignee: Nikon Corporation, Tokyo, Japan

[21] Appl. No.: 08/962,350

[22] Filed: Oct. 31, 1997

[30] Foreign Application Priority Data

Oct. 31, 1996 [JP] Japan .................................. 8-289626

[51] Int. Cl.⁶ .................................................. G03B 17/00
[52] U.S. Cl. ................................................................ 396/55
[58] Field of Search .................................................. 396/55

[56] References Cited

U.S. PATENT DOCUMENTS

| | | | |
|---|---|---|---|
| 5,101,230 | 3/1992 | Shikaume et al. | 396/55 |
| 5,231,445 | 7/1993 | Onuki et al. | 396/55 |
| 5,740,470 | 4/1998 | Kitagawa et al. | 396/55 |
| 5,771,069 | 6/1998 | Kobayashi | 396/55 X |
| 5,781,806 | 7/1998 | Satoh et al. | 396/55 |
| 5,805,937 | 9/1998 | Kitagawa | 396/55 |
| 5,835,798 | 11/1998 | Kitagawa | 396/55 |

OTHER PUBLICATIONS

U.S. Ser. No. 08/782,311, filed Jan. 15, 1997, Yoshihisa Kitagawa, Nikon Corporation.

*Primary Examiner*—W. B. Perkey

[57] ABSTRACT

A motion compensation device compensates for movement of an optical system of a camera. The motion compensation device includes a motion detection unit to detect motion of the optical system. A drive unit then drives a motion compensation lens in response to the detected motion while a stopping position detection unit detects a stopping position of the motion compensation lens. A centering operation unit moves the motion compensation lens from the stopping position to a first range about the optical axis or a second range greater than the first range about the optical axis. Depending upon whether the camera is in a one-frame photographic mode or a continuous photographic mode, the camera selects between the first or the second range for photographs subsequent to the first photograph.

23 Claims, 8 Drawing Sheets

MOTION COMPENSATION DEVICE TO CONTROL A CENTERING OPERATION OF A MOTION COMPENSATION LENS

CROSS-REFERENCE TO RELATED APPLICATIONS

This application is based upon and claims priority of Japanese Patent Application No. 08-289626 filed Oct. 31, 1996, the contents being incorporated herein by reference.

BACKGROUND OF THE INVENTION

The present invention relates to motion compensation devices which compensate for blurring motion of an optical image caused by movement of an optical system. More particularly, the present invention relates to motion compensation devices which control a centering operation of a motion compensation lens during rapid photography.

Image blur suppression devices work within an optical system and have as their object the suppression or reduction of blurring in an image projected onto an image plane. A motion compensation device is a type of image blur suppression device which compensates for motion incident upon the optical system. Motion is typically imparted to the optical system by way of vibrations in the optical system itself, or in a surrounding holding member. In general, known motion compensation devices cause a compensation lens to shift counter to the motion of the optical system so as to shift the image projected by the optical system relative to the optical system.

Conventional motion compensation devices detect motion of an optical system, such as a camera, by way of a sensor and move a motion compensation lens perpendicular to an optical axis in accordance with a detected output of the sensor. The motion compensation device then compensates to fix a subject image on an image plane.

Figure 8A:
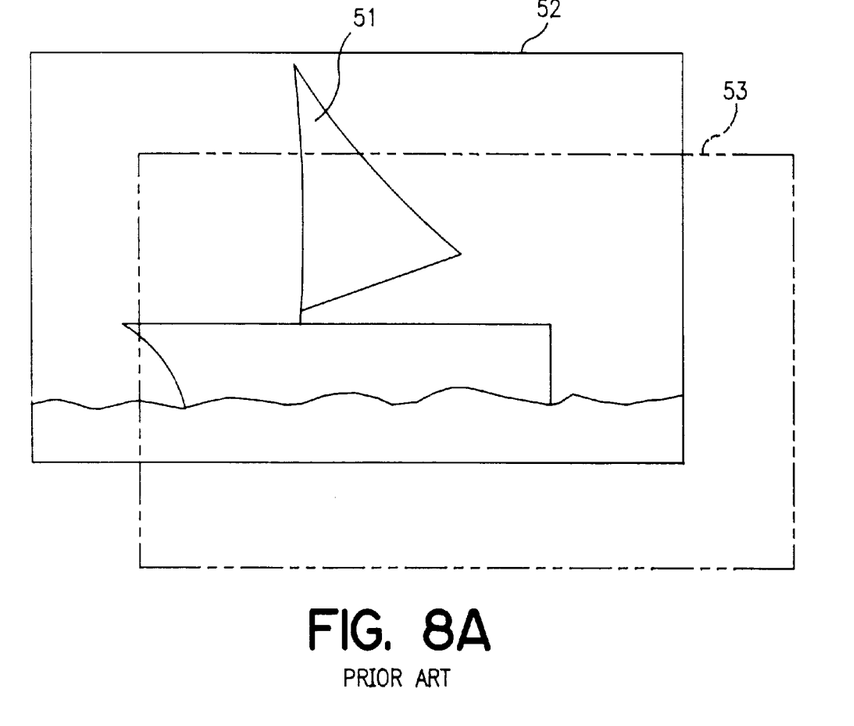
FIGS. 8A and 8B (PRIOR ART) are schematic views of a photographic picture plane resulting from operation of a conventional motion compensation device.
Figure 8B:
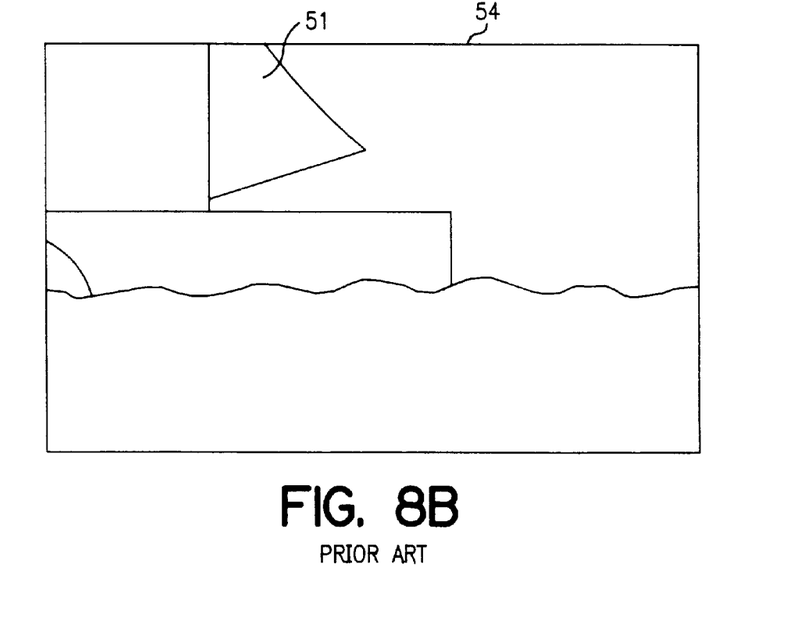

FIG. 8 (PRIOR ART) illustrates operation of a conventional motion compensation device. As illustrated in FIG. 8 (PRIOR ART), a photographic image plane 52 moves in response to driving of a motion compensation lens with a conventional motion compensation device. A photographer using a conventional motion compensation device half depresses a shutter button to photograph a subject 51 in photographic image plane 52 and to commence motion compensation by the motion compensation device. If no motion compensation is performed, a blurring motion is present in photographic image plane 52. However, when the motion compensation operation is repeatedly performed for a predetermined period of time, photographic image plane 52 shifts to become photographic image plane 53. When the photographer releases the shutter button, the motion compensation device stops.

Upon completion of the motion compensation, the motion compensation lens is moved to a center of an optical axis through a centering operation to prepare for a next photographic operation. During execution of a next motion compensation operation, the motion compensation lens moves from the center of the optical axis.

The conventional motion compensation device performs the motion compensation operation in response to half depression of the shutter button and sets a center of the motion compensation lens in a position separate from center of the optical axis. When photography is subsequently performed, the center of the motion compensation lens resumes movement from this position, reaches a boundary of a motion compensation range, and is unable to further perform motion compensation.

After the photographer has half depressed the shutter button, and the shutter button is fully depressed, motion compensation is resumed. Once the motion compensation operation is stopped, and after the centering operation has been performed, motion compensation operation may again resume. Then, after an exposure has been performed by opening and closing a shutter, motion compensation operation ends, and a subsequent centering operation is performed such that the camera is ready for a next photographic operation.

As illustrated in FIG. 8A (PRIOR ART), when the conventional motion compensation device commences motion compensation from a rest position, i.e. from a position where motion compensation is not performed, photographic image plane 52 moves to become photographic image plane 53. Thus, when the blurring motion compensation device performs a centering operation, the printed photographic image plane 52 is unexpectedly changed to photographic image plane 54.

In view of the above, when a photographer looks through a viewfinder of an optical system, such as a viewfinder of a single lens reflex camera, upon release of a half depressed shutter button, photographic image plane 52 becomes stationary due to motion compensation, but unexpectedly moves to become photographic image plane 54. In this manner, when motion compensation is performed, there is a problem that a photographic image is poorly set because the photographic image plane unexpectedly changes to a different photographic image plane.

Moreover, through full depression of the shutter button from the half depressed state, when exposure is performed after the centering operation has been performed, there is a problem that a photograph is taken of an unintended location.

In a camera equipped with a film autowind device, a conventional motion compensation device stops motion compensation for each frame of photography and also performs a centering operation between frames. During operation, a photographic frame which is subsequent to photographic image plane 52 subsequently becomes image plane 54. Furthermore, because photographs are taken in rapid succession, a problem is encountered that photographs taken with motion compensation are not intended by a photographer.

BRIEF SUMMARY OF THE INVENTION

It is therefore an object of the present invention to solve the above-mentioned problem by providing a motion compensation device which does not displace a photographic frame during rapid photography.

It is a further object of the present invention to reduce or eliminate perceived movement of a photographic frame from within a camera viewfinder.

Objects of the invention are achieved by a motion compensation device to compensate for detected motion of an optical system and to control a stopping position of a motion compensation lens with respect to a predetermined range, including a motion compensation unit to move the motion compensation lens in response to the detected motion; to and a control unit to move the motion compensation lens from the stopping position to a position within the predetermined range if the stopping position is outside the predetermined range.

Further objects of the invention are achieved by a motion compensation device to compensate for movement of an optical system, including a motion detection unit to detect motion of the optical system; a drive unit to drive a motion compensation lens in response to the detected motion; a stopping position detection unit to detect a stopping position of the motion compensation lens; a centering operation unit to move the motion compensation lens from the stopping position to a first range about an optical axis or a second range greater than the first range about the optical axis; and a range selection unit to select the first range or the second range.

Even further objects of the invention are achieved by a motion compensation device to compensate for movement of an optical system of a camera, including a motion detection unit to detect motion of the optical system; a drive unit to drive a motion compensation lens in response to the detected motion; a stopping position detection unit to detect a stopping position of the motion compensation lens; a centering operation unit to move the motion compensation lens from the stopping position to a first range about an optical axis or a second range greater than the first range about the optical axis; a range selection unit to select the first range or the second range; a mode selection unit to select between a one-frame photographic mode and a continuous photographic mode, wherein the first range is selected by the range selection unit during the one-frame photographic mode before execution of each frame of photography, and wherein the first range is selected by the range selection unit during the continuous photographic mode before execution of a first frame of photography and the second range is selected by the range selection unit before execution of subsequent frames of photography to the first.

BRIEF DESCRIPTION OF THE DRAWINGS

These and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
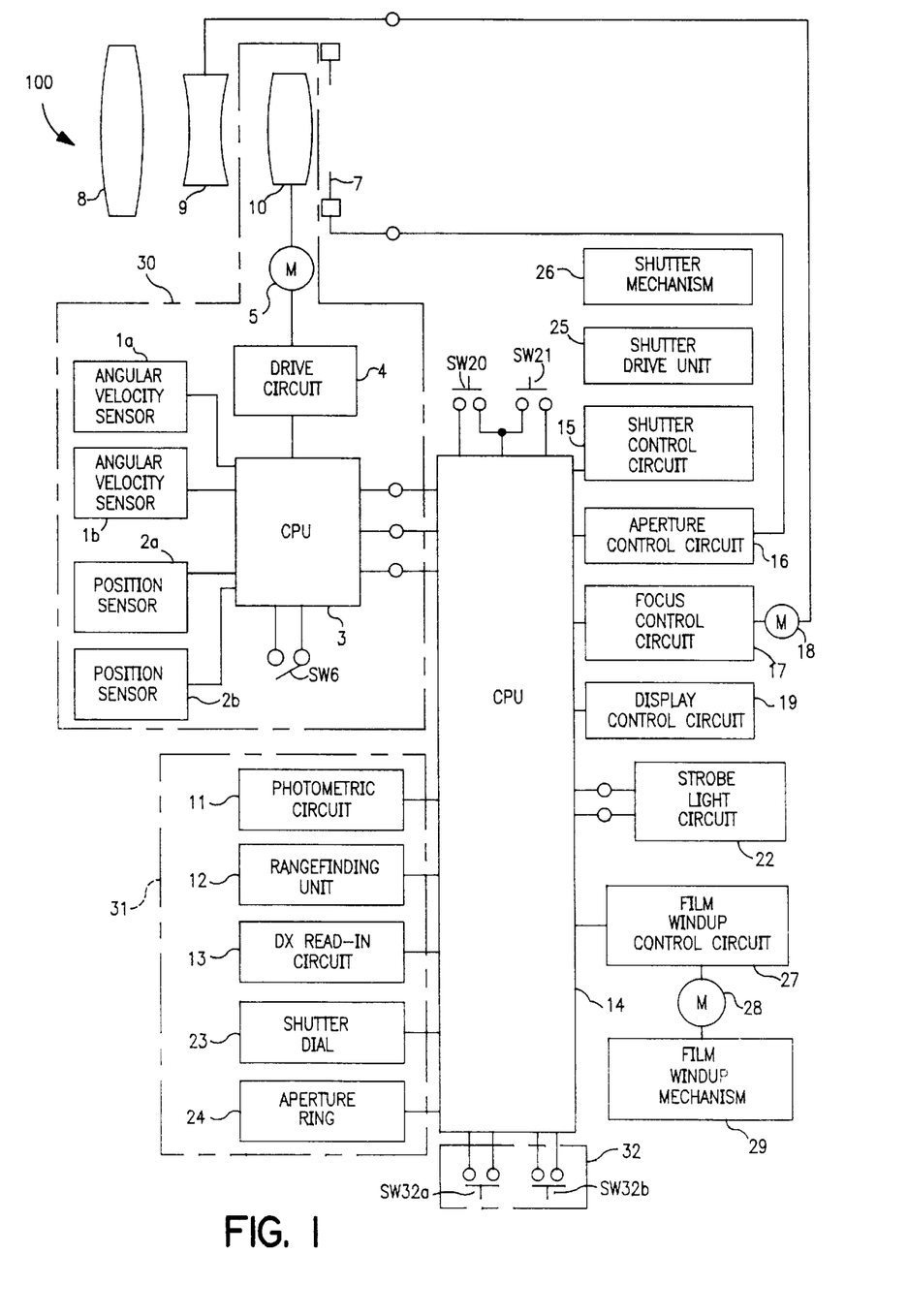
FIG. 1 is a block diagram of a motion compensation device according to a preferred embodiment of the present invention.

With reference to the drawings, and more particularly to FIG. 1, an optical device in the form of single lens reflex camera 100 is illustrated. Camera 100 includes a motion compensation unit 30, an exposure calculation unit 31, a main CPU 14, a shutter drive unit 25, a film windup mechanism 29, and the like.

The motion compensation unit 30 compensates for blurring motion during photography, and in addition includes a decision unit which decides whether motion compensation is possible. Motion compensation unit 30 is included within CPU 3.

CPU 3 controls various operations on the lens barrel side of camera 100. CPU 3 is a central processing unit which performs calculations on various kinds of information taken from angular velocity sensors 1a,1b, position sensors 2a, 2b, and the like. CPU 3 also indicates commencement and stoppage of driving of motion compensation lens 10 and decides whether a center of motion compensation lens 10 is within range 56 (see FIG. 4). If the center of motion compensation lens 10 is within range 56 (FIG. 4), re-commencement of motion compensation is possible.

CPU 3 detects vibration due to hand motion in up and down directions and left and right directions of camera 100. A detection result of vibration is output from angular velocity sensors 1a, 1b. The position of the motion compensation lens 10 is detected by position sensors 2a, 2b.

Drive circuit 4 is connected to motor 5 in order to drive motion compensation lens 10 and performs motion compensation control during an ON operation. Drive circuit 4 is connected to motion compensation control cancellation switch 6 such that motion compensation control is not performed during activation of cancellation switch 6. In order to drive motion compensation lens 10 in the up and down directions and the left and right directions, each of a pair of motors 5 (only one motor is shown) operates for each direction.

The photographic lens system includes first lens group 8, focusing lens group 9, motion compensation lens 10, and shutter vanes 7. Motion compensation lens 10 compensates for blurring motion by driving in a direction approximately perpendicular with respect to the optical axis by motor 5.

Main CPU 14 controls various operations of camera 100. For example, operations by the photographer are detected by signals from half depression switch SW20 and full depression switch SW21. Main CPU 14 calculates shutter time and aperture value based upon subject luminosity input from photometric circuit 11, a photographic range input from rangefinding circuit 12, and film sensitivity input from DX read-in circuit 13. Moreover, main CPU 14 is a central processing unit which generates centering operation commencement signals to move motion compensation lens 10 with respect to the optical axis.

In main CPU 14, exposure calculation unit 31 is connected to photometric circuit 11, rangefinding unit 12, DX read-in circuit 13, shutter dial 23, and aperture ring 24. Also connected to main CPU 14 is a shutter control circuit 15, a film windup control circuit 27, and an aperture control circuit 16 which controls operation of aperture vanes 7. Main CPU 14 further controls a focusing control circuit 17 which, based on a photometric result from photometric circuit 12, controls motor 18 to drive focusing lens 9, and, for example, a display control circuit 19 which displays the shutter time, aperture value and the like on LCDs (not shown) built into a viewfinder. Main CPU 14 also controls a strobe light generation circuit 22 which controls generation of strobe light by way of a strobe photography signal, a photographic mode selection unit 32 to select a photographic mode, half depression switch SW20, and full depression switch SW21.

The main CPU 14 is connected to CPU 3 of the lens barrel, and can transmit information and perform communication with CPU 3. Shutter control circuit 15 is a control circuit to control shutter drive unit 25. Shutter drive unit 25 is connected to shutter control unit 15 to drive shutter mechanism 26.

Film windup control circuit 27 is a control circuit which responds to a photographic mode selected by photographic mode selection unit 32. Film windup control circuit 27 controls operation of motor 28, which is connected to film windup control circuit 27 to drive film windup mechanism unit 29.

Half depression switch SW20 turns a power supply of camera 100 ON and initiates a series of photographic preparatory operations. Half depression switch SW20 turns ON when a release switch (not shown) is in a half depressed state. An ON signal is then input to main CPU 14. The main CPU 14 detects the ON signal and then initiates a series of corresponding operations in camera 100.

Full depression switch SW21 is a switch initiate an exposure operation of camera 100 and similar photographic operations. Full depression switch SW21 turns ON when the release switch (not shown) is fully depressed. An ON signal is then input to main CPU 14, which in turn initiates an exposure operation in camera 100.

Photographic mode selection unit 32 can select a single frame photographic mode which performs photography one frame at a time, or a continuous photography mode which performs continuous photography. Photographic mode selection unit 32 is equipped with a single-frame photography mode switch SW32A which selects photography one frame at a time, and a continuous photography mode switch SW32B which selects continuous photography, i.e. rapid, photography.

Next, with reference to CPU 3, a description is given of the operation of a motion compensation device according to a first preferred embodiment of the present invention.

Figure 2:
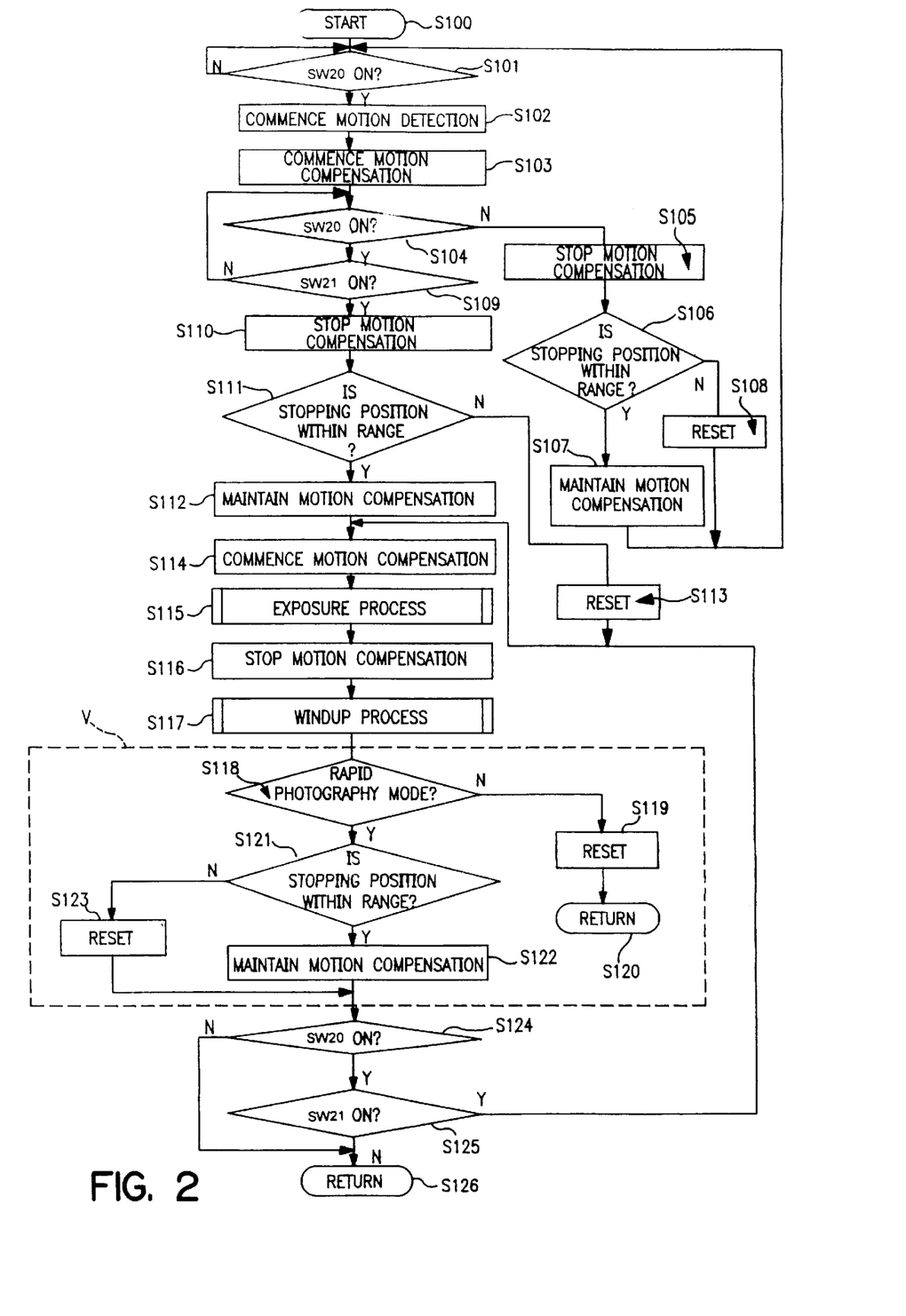
FIG. 2 is a flow chart illustration operation flow of a motion compensation device according to a preferred embodiment of the present invention.

FIG. 2 is a flow chart which illustrates operation of a motion compensation device according to the first preferred embodiment of the present invention.

In S100 (i.e. step 100), when a power supply switch (not shown) in camera 100 is turned ON, electric power from a power supply battery (not shown) is supplied to CPU 3. In response thereto, a flow sequence of CPU 3 and main CPU 14 begins. Furthermore, by way of the following description, except for cases which are particularly noted, each step is preferably performed by CPU 3.

In S101, main CPU 14 determines whether half depression switch SW20 is turned ON. If half depression switch is ON, the flow proceeds to S102, if the half depression switch SW20 is not ON, flow repeats until half depression switch SW20 is turned ON.

In S102, CPU 3 instructs angular velocity sensors 1a, 1b to commence motion detection. CPU 3, based on information from main CPU 14 that half depression switch SW20 is turned ON, instructs the angular velocity sensors 1a, 1b to output motion detection information. Angular velocity sensors 1a, 1b then detect motion of camera 100 and a lens barrel (if attached), and output corresponding motion detection information.

In S103, CPU 3 instructs drive circuit 4 to commence motion compensation. CPU 3 then calculates a motion compensation amount from the motion detection information output by angular velocity sensors 1a, 1b, a focal distance of the photographic lens system stored in CPU 3, and a photographic range which was input to CPU 3 from rangefinder circuit 12. CPU 3, based on the above calculated motion compensation amount, calculates a drive amount of motion compensation lens 10, and outputs a motion compensation signal to drive circuit 4, to thereby drive motor 5. As a result, motion compensation lens 10 initiates motion compensation for a predetermined amount of time by way of drive circuit 4. In addition, motion compensation can be observed in a viewfinder (not shown) of camera 100.

In S104, main CPU 14 determines whether half depression switch SW20 is turned ON. When half depression switch SW20 is OFF, flow proceeds to S105, and when half depression switch SW20 remains turned ON, flow proceeds to S110.

In S105, CPU 3 instructs drive circuit 4 to stop motion compensation. Based on information from main CPU 14 that half depression switch SW20 is turned OFF, CPU 3 outputs a motion compensation stop signal to drive circuit 4, and subsequently motor 5 causes motion compensation lens 10 to stop. Main CPU 14 then outputs a centering operation commencement signal to CPU 3 to bring motion compensation lens 10 close to the optical axis in response to information that half depression switch SW20 is turned OFF.

Figure 3:
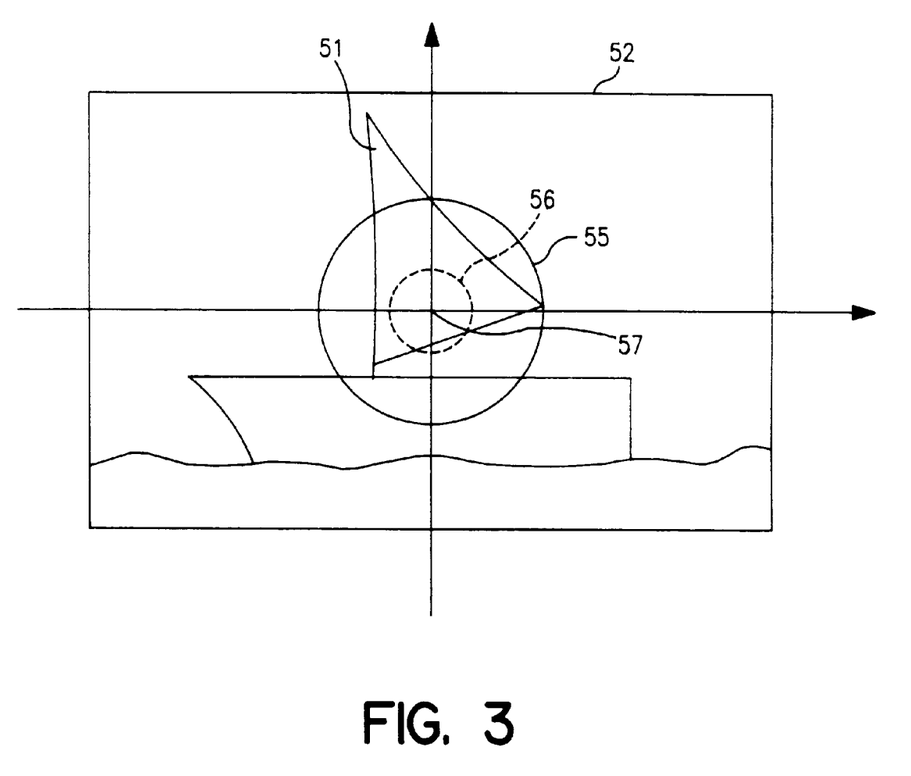
FIG. 3 is a schematic view of a range of possible motion compensation resumption and a range of possible movement of a motion compensation lens, superimposed on a photographic image plane.

FIG. 3 illustrates a range in which motion compensation resumption is possible and a range of possible movement of motion compensation lens 10 superimposed on photographic image plane 52.

Range 56 of possible motion compensation resumption is a range in which motion compensation lens 10 may resume operation from a stopping position. Range 56 is preferably set to a range which can make an amount of movement of motion compensation lens 10 small. This is a case which moves motion compensation lens 10 as far as possible within a range of possible motion compensation resumption from a stopping position, even when motion compensation lens 10 has been driven to optical axis 57.

Range 55 is a range of movement limiting movement of a center of motion compensation lens 10 during the motion compensation operation. When motion compensation lens 10 performs the motion compensation operation, optical axis 57 is shifted by motion compensation lens 10 within range 56 of range 55.

In S106, CPU 3 determines whether a stopping position of motion compensation lens 10 is within range 56 of possible motion compensation resumption. CPU 3 then instructs the position detection sensors 2a, 2b to detect the stopping position of the motion compensation lens 10 based on a centering commencement signal from main CPU 14. Position detection sensors 2a, 2b then detect a stopping position of motion compensation lens 10, and output stopping position detection information to CPU 3. CPU 3 then determines whether a center of motion compensation lens 10 is within range 56 of possible motion compensation resumption based on the stopping position detection information from position detection sensors 2a, 2b. When optical axis 57, at the time of stoppage of motion compensation, is within range 56 of possible motion compensation resumption, CPU 3 determines that motion compensation may be resumed from the stopping position of motion compensation lens 10, and flow proceeds to S107.

On the other hand optical axis 57, upon stoppage of the motion compensation, may be within range 55 of possible movement when optical axis 57 is outside range 56 of possible motion compensation resumption. Then CPU 3 determines that motion compensation cannot be resumed from the stopping position of motion compensation lens 10, and flow proceeds to S108.

In S107, CPU 3 instructs drive circuit 4 to maintain the status of motion compensation lens 10. CPU 3 then outputs a signal to drive circuit 4 such that motor 5 maintains motion compensation lens 10 in the stopping position. Then, returning to S101, main CPU 14 determines whether half depression switch SW20 is ON.

In S108, CPU 3 instructs drive circuit 4 to reset motion compensation lens 10. CPU 3, by not performing a centering operation, such that optical axis 57 moves as far as on the circle of range 56 of possible motion compensation resumption, outputs a signal to drive circuit 4. Motor 5 drives the center of motion compensation lens 10 into range 56 of possible motion compensation resumption. Then, returning to S101, main CPU 14 determines whether half depression switch SW20 is again ON.

In S109, main CPU 14 determines whether full depression switch SW21 is ON. When full depression switch SW21 connected to half depression switch SW20 is ON, the routine proceeds to S110. When full depression switch SW21 is OFF, flow returns to S104, and a determination is made whether half depression switch SW20 is ON. Main CPU 14 outputs to CPU 3 a centering operation commencement signal in order to bring motion compensation lens 10 close to optical axis 57 based on information that full depression switch SW21 is ON.

In S110, CPU 3 instructs drive circuit 4 to stop motion compensation. CPU 3 then outputs to drive circuit 4 a motion compensation stop signal based on information that full depression switch SW20 is ON. Drive circuit 4 then controls motor 5 to stop driving of motion compensation lens 10.

In S111, CPU 3 determines whether the stopping position of motion compensation lens 10 is within range 56 of possible motion compensation resumption. CPU 3, based on the centering operation commencement signal, then instructs position detection sensors 2a, 2b to detect the stopping position of motion compensation lens 10. CPU 3, based on the stopping position detection information from position detection sensors 2a, 2b, next determines whether the center of motion compensation lens 10 is within range 56 of possible motion compensation resumption. When optical axis 57 is within range 56 of possible motion compensation resumption, because motion compensation can be resumed from the stopping position of motion compensation lens 10, the routine proceeds to S112.

On the other hand, when optical axis 57 is outside range 56 of possible motion compensation resumption, which is within range 55 of possible movement, because motion compensation cannot be resumed from the stopping position, the routine proceeds to S1 13.

In S112, CPU 3 instructs drive circuit 4 to maintain motion compensation lens 10. CPU 3 also instructs drive circuit 4 to maintain motion compensation lens 10 in the stopping position, and accordingly, motor 5 maintains motion compensation lens 10 in the stopping position.

In S113, CPU 3 instructs drive circuit 4 to reset motion compensation lens 10. CPU 3 instructs drive circuit 4 to move optical axis 57 as far as possible on range 56 of possible motion compensation resumption (denoted by a circle in FIG. 3). In S113, motor 5 drives the center of motion compensation lens 10 into range 56 of possible motion compensation resumption, and the routine proceeds to S114.

In S114, CPU 3 instructs the commencement of motion compensation by drive circuit 4. CPU 3 also instructs drive circuit 4 to drive motion compensation lens 10 by way of motor 5, based on the motion detection information from angular velocity sensors 1a, 1b. The center of motion compensation lens 10 then, being in range 56 of possible motion compensation resumption or moving from on the circle of range 56 of possible motion compensation resumption, motion compensation lens 10 resumes motion compensation.

In S115, main CPU 14 instructs exposure. Main CPU 14 instructs the driving of shutter drive unit 25 by the shutter control circuit 15, the shutter mechanism 26 driven by way of shutter drive unit 25 performs photography (exposure) by opening and closing the shutter. CPU 3 instructs drive circuit 4 to drive motion compensation lens 10, and drive circuit 4 performs motion compensation during the exposure by way of motor 5.

In S116, CPU 3 instructs drive circuit 4 to stop motion compensation. CPU 3, in order to stop driving of motor 5, outputs a motion compensation stop signal to drive circuit 4. Motor 5 then causes motion compensation lens 10 to stop.

In S117, main CPU 14 instructs a film winding up process by film windup control circuit 27. Main CPU 14 instructs the driving of motor 28 by film windup control circuit 27, and the film windup mechanism, driven by way of motor 28, performs winding up of the film. Main CPU 14 outputs a centering operation commencement signal to CPU 3 in order to bring motion compensation lens 10 close to the optical axis.

In S118, main CPU 14 determines whether camera 100 is in rapid, i.e. "continuous", photography mode. Main CPU 14, when the continuous photography mode selection switch SW32B is operated ON, determines that the continuous photography mode has been selected, and flow proceeds to S121. If it is not the continuous photography mode, when the single frame photography selection switch SW32A is turned ON, main CPU 14 determines that the single frame photographic mode is selected, and flow proceeds to S119. CPU 3, based on the determination of main CPU 14, then instructs drive circuit 4 to change the centering operation of motion compensation lens 10.

In S119, CPU 3 instructs drive circuit 4 to reset motion compensation lens 10. CPU 3, determining that the single frame photographic mode is selected, instructs drive circuit 4 such that the center of motion compensation lens 10 moves to optical axis 57. Motor 5 drives the center of motion compensation lens 10 to optical axis 57, and the sequence of operations ends in S120.

In S121, CPU 3 determines whether a stopping position of motion compensation lens 10 is within range 56 of possible motion compensation resumption. When optical axis 57 is within range 56 of possible motion compensation resumption, in order to be able to resume motion compensation from the stopping position, the routine proceeds to S122. On the other hand, when optical axis 57 is within range 55 of possible movement, but is outside range 56 of possible motion compensation resumption, because motion compensation cannot be resumed from the stopping position, the routine proceeds to S123.

In S122, CPU 3 instructs drive circuit 4 to maintain the status of motion compensation lens 10. CPU 3 instructs drive circuit 4 to maintain motion compensation lens 10 at the stopping position, and motor 5 maintains motion compensation lens 10 in the stopping position.

In S123, CPU 3 instructs drive circuit 4 to reset motion compensation lens 10. CPU 3 instructs drive circuit 4 to move optical axis 57 into the circle of range 56 of possible motion compensation resumption. Motor 5 then drives the center of motion compensation lens 10 into the circle of range 56 of possible motion compensation resumption.

In S124, main CPU 14 determines whether half depression switch SW20 is ON. When half depression switch SW20 is OFF, the routine proceeds to S126. The sequence of operations then ends in S126. When half depression switch SW20 is still turned ON, the routine proceeds to S125.

In S125, main CPU 14 determines whether full depression switch SW21 is ON. When half depression switch SW20 and in addition full depression switch SW21 are turned ON, flow returns to S114. In S114, CPU 3 instructs drive circuit 4 to commence motion compensation. Next in S115, continuous photography of the second frame is performed. In S125, when full depression switch SW21 is OFF, the continuous photography mode is stopped, and the routine proceeds to S126. CPU 3 instructs drive circuit 4 to move the center of motion compensation lens 10 to optical axis 57 by way of motor 5, and the sequence of operations ends. When the continuous photography mode ends, in S118, main CPU 14 determines whether camera 100 is in rapid photography mode. When camera 100 is in rapid photography mode, the routine proceeds to S119. In S120, the center of motion compensation lens 10 is moved to optical axis 57, and the sequence of operations ends.

In the first preferred embodiment of the present invention, in S106, when optical axis 57 of the motion compensation stop time is not within range 56 of possible motion compensation resumption, CPU 3 instructs drive circuit 4 such as to move this optical axis 57 into the circle of range 56 of possible motion compensation resumption. Accordingly, looking in the viewfinder in the course of setting the composition, when the photographer has let go of half depression switch SW20, because at this instant the amount of movement of the photographic image plane can be made a minimum, the inconvenience of difficult setting of the composition can be reduced.

In the first preferred embodiment of the present invention, when optical axis 57 is not within range 56 of possible motion compensation resumption, the center of motion compensation lens 10 is driven into the circle of range 56 of possible motion compensation resumption, and commencing motion compensation, shutter mechanism 26 commences an exposure operation. Accordingly, in comparison with once driving the center of motion compensation lens 10 by way of the centering operation to optical axis 57, the possibility can be made low of the center of motion compensation lens 10 reaching range 55 of possible movement during an exposure. Moreover, a photograph which is closer to the composition intended before exposure can be photographed.

In the first preferred embodiment of the present invention, in S121 is a case in which a continuous photography mode is selected. When optical axis 57 of the motion compensation stop time is not within range 56 of possible motion compensation resumption, the center of motion compensation lens 10 is driven into the circle of range 56 of possible motion compensation resumption. Accordingly, the displacement of photographic frames which are rapidly photographed is reduced, and the possibility can be made low of the center of motion compensation lens 10 reaching the range of possible movement during an exposure.

On the other hand, when optical axis 57 of the motion compensation stop time is within range 56 of possible motion compensation resumption, because motion compensation lens 10 is maintained in this stopping position, large movements of the photographic image plane do not arise, and there is no inconvenience of difficulty in setting the composition. Moreover, because the motion compensation operation is resumed from the stopping position, the center of motion compensation lens 10 does not, during an exposure, reach the limits of the boundary of possible movement, and photographs are not taken which are displaced from the composition intended before photography. Furthermore, when the continuous photography mode is selected, the composition of the photographic frames does not displace.

Second Preferred Embodiment

Figure 4:
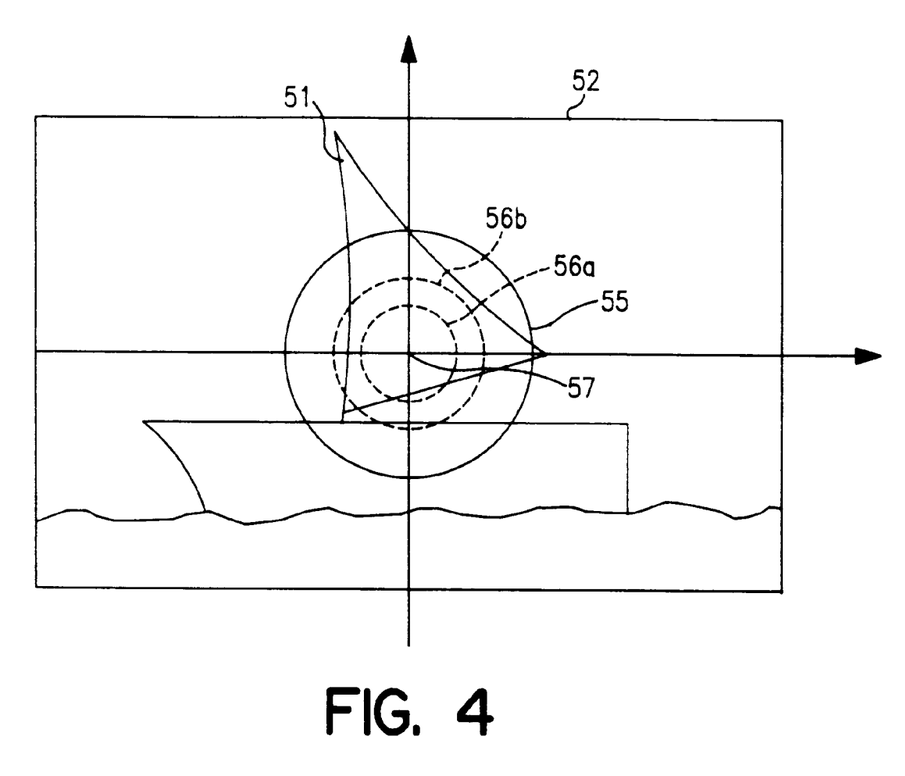
FIG. 4 is a schematic view of a range of possible motion compensation resumption subdivided into a narrow range and a wide range, and a range of possible movement of a motion compensation lens, both superimposed on a photographic image plane.
Figure 5:
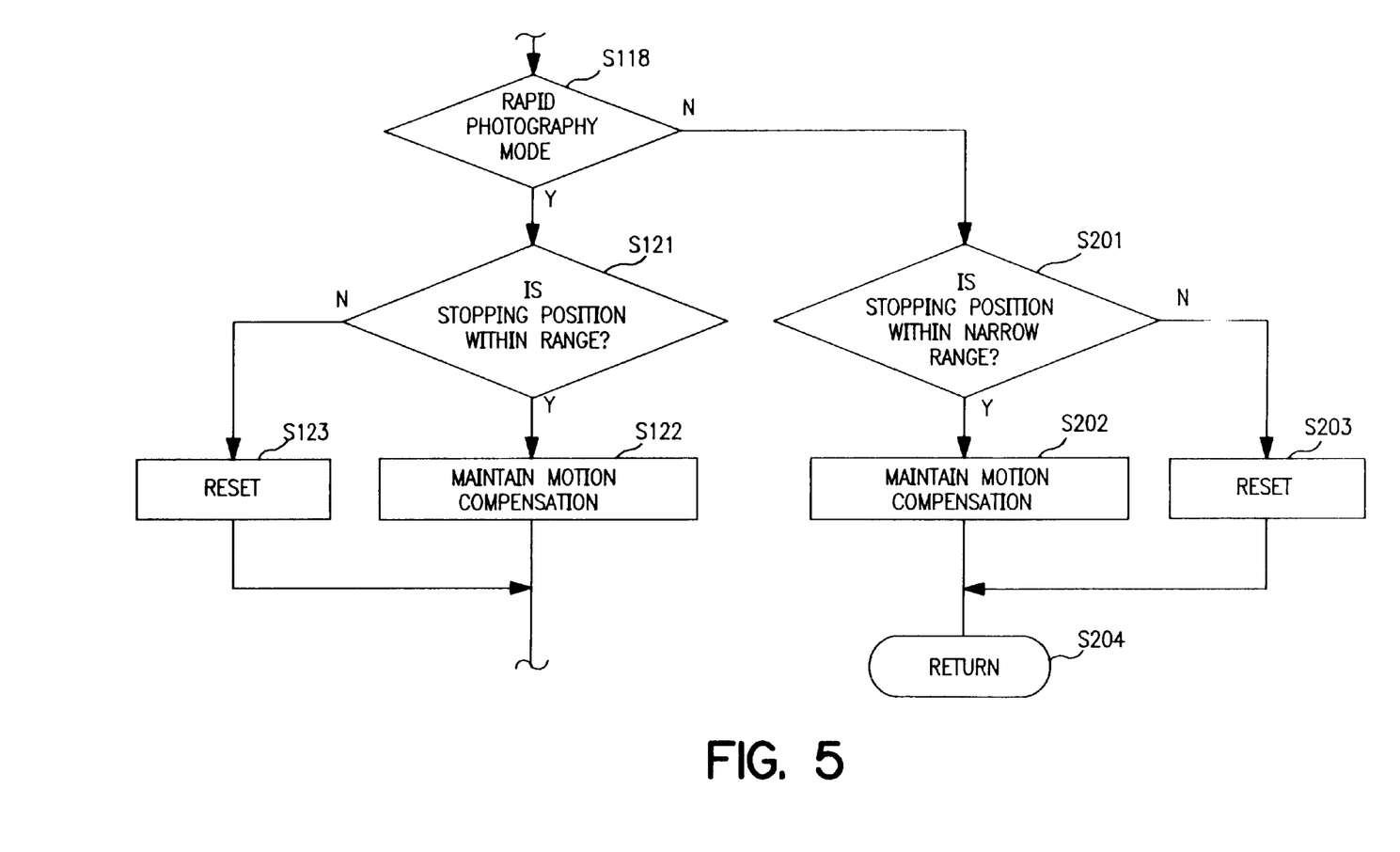
FIG. 5 is a flow chart illustrate operation of a motion compensation device according to a second preferred embodiment of the present invention.

FIG. 4 is a diagram showing the range of possible motion compensation resumption, subdivided into a narrow range and a wide range, and the range of possible movement, superimposed on a photographic picture plane. FIG. 5 is a flow chart which illustrates a portion of the operation of the motion compensation device according to the second preferred embodiment of the present invention.

Furthermore, FIG. 5 is a flow chart of a portion corresponding to the portion V of FIG. 2. The operation steps which are the same as in the first preferred embodiment are denoted by the same symbols, and the details of the operations in these steps are omitted.

As shown in FIG. 5, in the second preferred embodiment of the present invention, the region 56 of possible motion compensation resumption which is stored in CPU 3 is subdivided into 2 stages, a narrow range 56a of possible motion compensation resumption and a wide range 56b of possible motion compensation resumption.

The operation of the motion compensation device according to the second preferred embodiment of the present invention will next be described, centered on the operation of CPU 3.

As shown in FIG. 5, and in particular S118, main CPU 14 determines whether camera 100 is continuous photography mode, and accordingly proceeds to S121. When camera 100 is not in the continuous photography mode but is the single frame mode, flow proceeds to S201. CPU 3, based on the determination of main CPU 14, instructs drive circuit 4 such as to change the centering operation of motion compensation lens 10.

In S121, CPU 3 determines whether the stopping position of motion compensation lens 10 is within the wide range 56b of possible motion compensation resumption. When optical axis 57 is within the wide range 56b of possible motion compensation resumption, proceeding to S122, motion compensation lens 10 is maintained in its stop position by way of motor 5. When the optical axis is outside the wide range 56b of possible motion compensation resumption, proceeding to S123, CPU 3 instructs drive circuit 4 to drive motion compensation lens 10 into the circle of the wide range 56b of possible motion compensation resumption.

In S201, CPU 3 determines whether the stopping position of motion compensation lens 10 is within the narrow range 56a of possible motion compensation resumption. When optical axis 57 is within the narrow range 56a of possible motion compensation resumption, proceeding to S202, motion compensation lens 10 is maintained in its stopping position. When the optical axis is outside the narrow range 56a of possible motion compensation resumption, proceeding to S203, CPU 3 instructs to drive motion compensation lens 10 into the circle of the narrow range 56a of possible motion compensation resumption.

In the second preferred embodiment of the present invention, and in particular S118, continuous photography mode has been selected. When optical axis 57 at motion compensation stop time is not within range 56 of possible motion compensation resumption, the center of motion compensation lens 10 is driven into the circle of the wide range 56b of possible motion compensation resumption.

In particular, during film windup, the electrical power consumption by the operations other than motion compensation is large, but because the amount of movement of motion compensation lens 10 can be small, the electric power consumption can be reduced. Moreover, at a time of continuous photography, because the time required for the movement of motion compensation lens 10 can be made small, the electric power consumption can be reduced. Furthermore, by making the amount of movement of motion compensation lens 10 small, it becomes possible to have the subject be preferably in the same position, and the displacement of the composition of photographic frames taken in rapid succession can be reduced.

Other Preferred Embodiments

Figure 6:
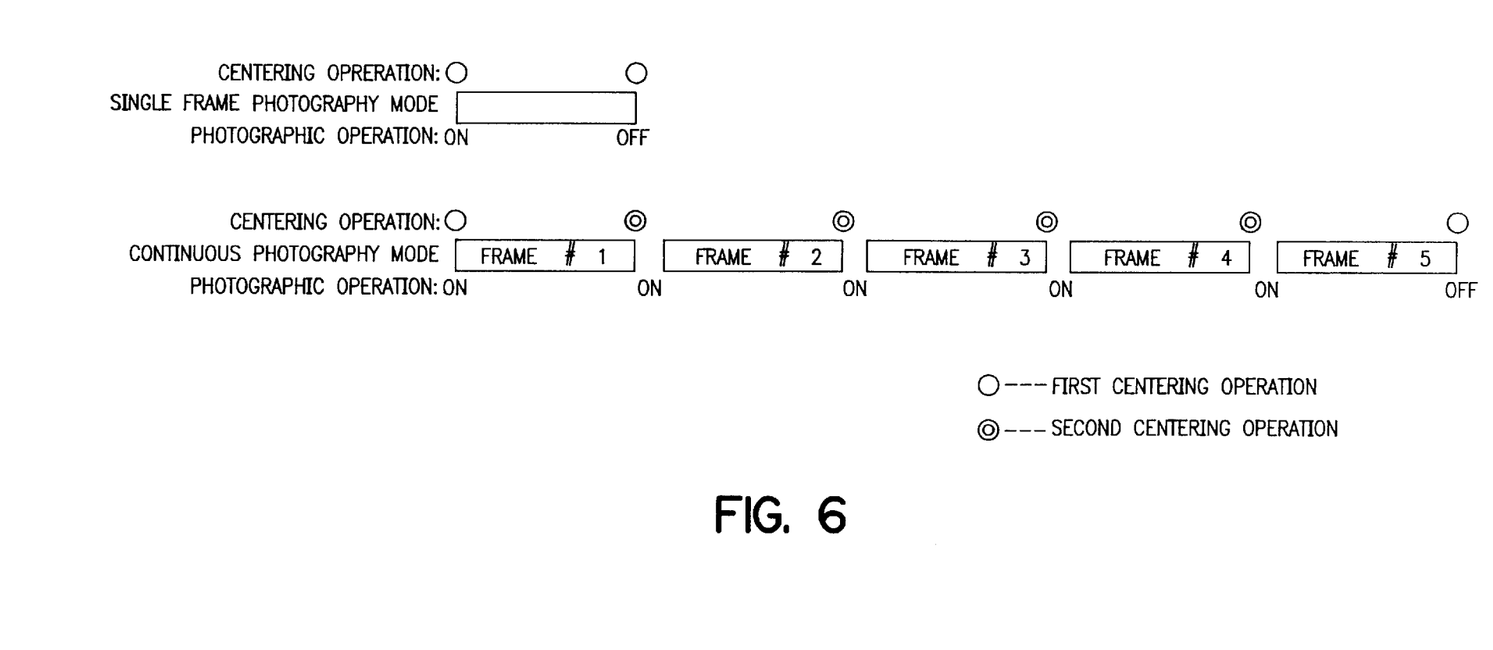
FIG. 6 is a schematic view of a centering operation when a single frame photography mode or a continuous photography mode has been selected.

FIG. 6 is a schematic view of a centering operation to illustrate the centering operation when the single frame photography mode or the continuous photography mode has been selected in this embodiment of the present invention. As shown in FIG. 6, when the single frame mode is selected, before photography and after photography, the motion compensation lens is driven by way of a first centering operation (○ in the drawing). Moreover, when the continuous photography mode is selected, before photography of the first frame and in the last photographic frame, moves the motion compensation lens by way of a first centering operation (○ in the drawing), before photography of the second and subsequent frames, the motion compensation lens is driven by way of a second centering operation (a in the drawing). Furthermore, in FIG. 6, as the final photographic frame when the continuous photography mode is selected, a last frame when the continuous photography was stopped is shown in the example, but the last frame at the time of rapid photography is also similar.

The nature of the first centering operation and the second centering operation is described below with reference to FIGS. 7A–D.

FIGS. 7A–E are schematic views of different types of centering operations to illustrate centering operations according to a preferred embodiment of the present invention.

Figure 7A:
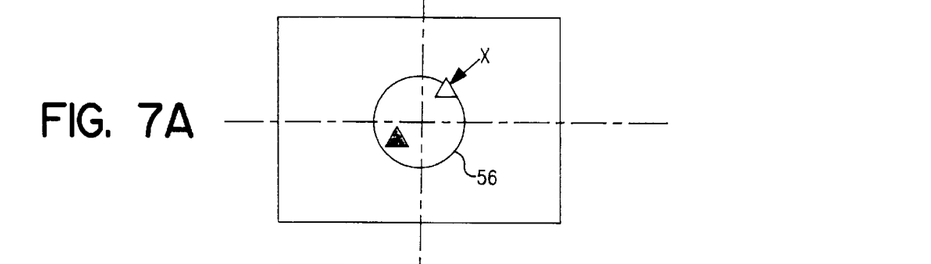
FIGS. 7A–7E are schematic views of different types of centering operations according to preferred embodiments of the present invention.

FIG. 7A illustrates a basic pattern of a centering operation. When the stopping position (x in the drawing) of motion compensation lens 10 is within range 56 of possible motion compensation resumption, motion compensation lens 10 is maintained (Δ in the drawing) in this position. When the stopping position (x in the drawing) of motion compensation lens 10 is outside range 56 of possible motion compensation resumption, motion compensation lens 10 is driven (Δ in the drawing) into the circle of range 56 of possible motion compensation resumption.

Figure 7B:
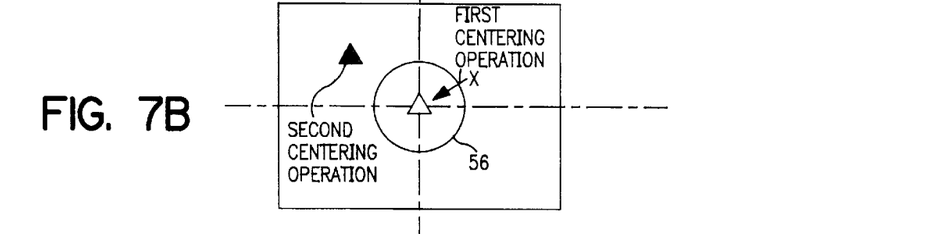

As illustrated in FIG. 7B, before photography and after photography at the time of single frame photography, and in addition before photography of the first frame and at the last photographic frame (termed hereinbelow the "first centering operation") at the time of continuous photography, driving (Δ in the drawing) from the stopping position (x in the drawing) of motion compensation lens 10 up to the optical axis of the whole photographic optical system, in the second centering operation at the time of continuous photography (termed hereinbelow the "second centering operation"), motion compensation lens 10 is maintained (Δ in the drawing) in its stopping position (x in the drawing).

Figure 7C:
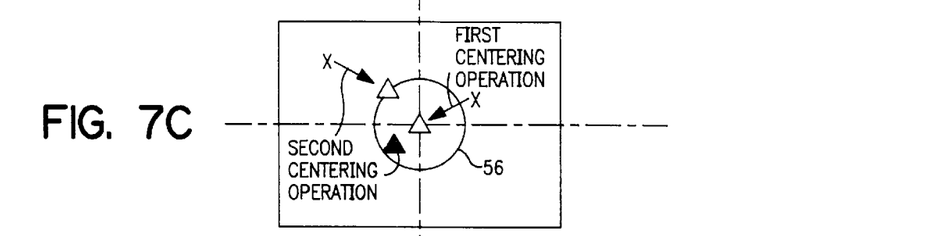

As illustrated in FIG. 7C, in the first centering operation, when the stopping position of motion compensation lens 10 is within range 56 of possible motion compensation resumption, is maintained (Δ in the drawing) in this stopping position. When the stopping position (Δ in the drawing) is outside range 56 of possible motion compensation resumption, motion compensation lens 10 is driven (Δ in the drawing) into the circle of range 56 of possible motion compensation resumption. In the second centering operation, motion compensation lens 10 is maintained (Δ in the drawing) in its stopping position (x in the drawing).

Figure 7D:
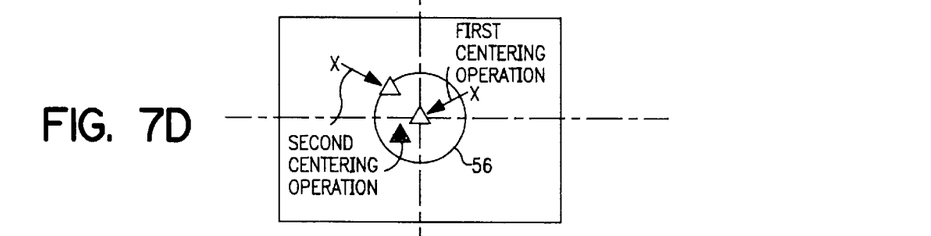

As illustrated in FIG. 7D, in the first centering operation, motion compensation lens 10 is driven (Δ in the drawing) up to the optical axis of the whole photographic optical system from its stopping position (x in the drawing). In the second centering operation, when the stopping position of motion compensation lens 10 is within range 56 of possible motion compensation resumption, it is maintained (Δ in the drawing) in this stopping position. When motion compensation lens 10 is outside range 56 of possible motion compensation resumption, it is driven (Δ in the drawing) into the circle of range 56 of possible motion compensation resumption.

Figure 7E:
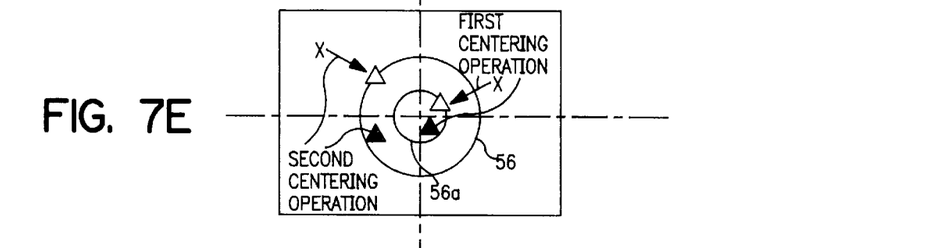

As illustrated in FIG. 7E, in the first centering operation, when the stopping position of motion compensation lens 10 is within the narrow range 56a of possible motion compensation resumption, it is maintained (Δ in the drawing) in this stopping position. When the stopping position (x in the drawing) is outside the narrow range 56a of possible motion compensation resumption, it is driven (Δ in the drawing) into the circle of the narrow range 56a of motion compensation. In the second centering operation, when the stopping position of motion compensation lens 10 is within the wide range 56b of possible motion compensation resumption, it is maintained (Δ in the drawing) in this stopping position. When the stopping position (x in the drawing) is outside the wide range 56b of possible motion compensation resumption, it is driven (Δ in the drawing) into the circle of the wide range 56b of motion compensation.

According to other embodiments of the present invention, by making an amount of movement of motion compensation lens 10 small, a reduction of electric power consumption, and displacement of photographic frames during rapid photography, can be prevented. On the other hand, by taking the amount of movement of motion compensation lens 10 as large, the strokes in order for motion compensation can be taken to be long. The amount of movement of motion compensation lens 10 can select the appropriate centering operation in the setting stages, by way of balancing the above requirements.

There present invention is not particularly limited to the embodiments set forth above. Various modifications and changes are possible which fall within the scope of the present invention. For example, the continuous photographic mode of the modes of embodiment of the present invention may be executed by setting ON both the switch SW32B which selects the rapid photographic mode and full depression switch SW21. In this case, in S118, when both the rapid photography selection switch SW32B and full depression switch SW21 are turned OFF, the center of motion compensation lens 10 is moved up to optical axis 57.

Moreover, in the case in which range 56 of possible motion compensation resumption is subdivided into the narrow range 56a of possible motion compensation resumption and the wide range 56b of possible motion compensation resumption, when both the rapid photography selection switch SW32B and full depression switch SW21 have been turned ON, the center of motion compensation lens 10 can be moved into the circle of the wide range 56b of possible motion compensation resumption. On the other hand, when both the rapid photography selection switch SW32B and full depression switch SW21 have been turned OFF, the center of motion compensation lens 10 can be driven into the circle of the narrow range 56a of possible motion compensation resumption.

Moreover, in S119, S126, and S203, the center of motion compensation lens 10 moves up to optical axis 57, but may be caused to move into the circle of range 56 of possible motion compensation resumption. In this manner, by way of moving the center of motion compensation lens 10 into the circle of range 56 of possible motion compensation resumption, when photography has been resumed in continuation, motion compensation can be rapidly performed. When both the rapid photography selection switch SW32B and full depression switch SW21 have been turned OFF, the center of motion compensation lens 10 may be driven into the circle of range 56 of possible motion compensation resumption.

Range 56 of possible motion compensation resumption of the second mode of embodiment of the present invention is subdivided in 2 stages into the narrow range 56a of possible motion compensation resumption and the wide range 56b of possible motion compensation resumption, but range 56 of possible motion compensation resumption can also be subdivided into plural ranges of possible motion compensation resumption, setting successive n stages from a narrow range to a wide range.

Moreover, when the voltage of the electric supply current has fallen, CPU 3, by way of automatically setting range 56 of possible motion compensation resumption to a wide range, making the amount of movement of the motion compensation lens small, can reduce the amount of electric supply current which is consumed. Furthermore, when it is the last of continuous photography, and the stopping position of motion compensation lens 10 is outside the narrow range of possible motion compensation resumption, CPU 3 can instruct to move the center of motion compensation lens 10 into the circle of the narrow range of possible motion compensation resumption. Accordingly, when resuming continuous photography, having ended continuous photography, the motion compensation movement amount of motion compensation lens 10 can be made large.

As described in detail hereinabove, by way of the first preferred embodiment of the present invention and with reference to the motion compensation control unit, when the stopping position of the motion compensation optical system is within a predetermined range, the motion compensation optical system is maintained in its stopping position. When the stopping position of the motion compensation optical system is outside the predetermined range, the motion compensation control unit instructs to drive the motion compensation optical system into this predetermined range. Thus, even if the stopping position of the motion compensation optical system is outside the predetermined range, the motion compensation optical system only moves from this stopping position into the predetermined range, and the amount of movement in the composition of the photographic image plane, unintended by the photographer, can be small, and the composition can easily be decided. The predetermined range is a range in which the motion compensation optical system can resume motion compensation from its stopping position. However, there is no risk of the motion compensation optical system reaching the limit of the range of possible movement after resuming motion compensation.

According to another preferred embodiment of the present invention, the amount of movement which moves the motion compensation optical system from the stopping position of the motion compensation optical system to the range of possible motion compensation resumption, in a range which can be smaller than the amount of movement when driving the center of the motion compensation optical system up to the optical axis of the whole photographic optical system, because the range of possible motion compensation resumption is set, the displacement of the composition intended by the photographer and the actually photographed composition can be small, and the composition can easily be decided.

The motion compensation control unit can suitably select the centering operation because the motion compensation control unit is equipped with a centering operation variable instruction unit when operating by way of the first mode, or when operating by means of the second mode. Also, because the centering operation variable instruction unit instructs a first and/or a second centering operation, based on a photographic operation ON signal and/or a photographic operation OFF signal, it can change the centering operation according to when the first mode is selected, and when the second mode is selected.

Although a few preferred embodiments of the present invention have been illustrated and described, it will be appreciated by those skilled in the art that changes may be made in these embodiments without departing from the principles and spirit of the invention, the scope of which is defined in the claims and their equivalents.

What is claimed is:

1. A motion compensation device to compensate for detected motion of an optical system and to control a stopping position of a motion compensation lens with respect to a predetermined range, comprising:

a motion compensation unit to move the motion compensation lens in response to the detected motion; and a control unit to move the motion compensation lens from the stopping position to a position within the predetermined range if the stopping position is outside the predetermined range.

2. The motion compensation device according to claim 1, wherein said predetermined range is a range in which resumption of motion compensation is possible by said motion compensation unit from the stopping position.

3. The motion compensation device according to claim 1, wherein the movement of the motion compensation lens to the predetermined range is less than movement to a center of the optical system.

4. The motion compensation device according to claim 3, wherein the predetermined range is settable to plural ranges.

5. The motion compensation device according to claim 1, wherein the predetermined range is settable to plural ranges.

6. A motion compensation device to compensate for movement of an optical system, comprising:

a motion detection unit to detect motion of the optical system;

a drive unit to drive a motion compensation lens in response to the detected motion;

a stopping position detection unit to detect a stopping position of the motion compensation lens;

a centering operation unit to move the motion compensation lens from the stopping position to a first range about an optical axis or a second range greater than the first range about the optical axis; and a range selection unit to select the first range or the second range.

7. The motion compensation device according to claim 6, wherein the optical system is within a camera which houses film, further comprising:

a shutter mechanism to expose the film;

a film windup mechanism to wind up the film; and a film windup control circuit to control operation of said film windup mechanism during selection of the first range or the second range.

8. The motion compensation device according to claim 6, wherein the first range is selected during a one-frame photographic mode, and the second range is selected during a continuous photographic mode.

9. The motion compensation device according to claim 6, further comprising:

a mode selection unit to select between a one-frame photographic mode and a continuous photographic mode, wherein the first range is selected by said range selection unit during the one-frame photographic mode before execution of each frame of photography, and wherein the first range is selected by said range selection unit during the continuous photographic mode before execution of a first frame of photography and the second range is selected by said range selection unit before execution of subsequent frames of photography to the first.

10. The motion compensation device according to claim 6, wherein said centering operation unit maintains the stopping position of the motion compensation lens within the first or the second range if the motion compensation lens is already within the first or second range.

11. The motion compensation device according to claim 10, wherein said centering operation unit maintains the stopping position of the motion compensation lens within the first range if said stopping position detection unit detects the first range, and said centering operation unit maintains the stopping position of the motion compensation lens within the second range if said stopping position detection unit detects the second range.

12. The motion compensation device according to claim 6, wherein said centering operation unit maintains the stopping position of the motion compensation lens within the first range if said stopping position detection unit detects the first range, and said centering operation unit maintains the stopping position of the motion compensation lens within the second range if said stopping position detection unit detects the second range.

13. The motion compensation device according to claim 12, wherein the second range is settable to plural ranges from a narrow range to a wide range.

14. The motion compensation device according to claim 6, wherein the second range is settable to plural ranges from a narrow range to a wide range.

15. The motion compensation device according to claim 14, wherein the first range is an approximately central portion of a range over which it is possible to drive the motion compensation lens.

16. The motion compensation device according to claim 6, wherein the first range is an approximately central portion of a range over which it is possible to drive the motion compensation lens.

17. The motion compensation device according to claim 6, wherein the second predetermined range is a range of motion compensation resumption, in which it is possible to resume motion compensation from the stopping position.

18. The motion compensation device according to claim 17, wherein movement of a center of the motion compensation lens to the second predetermined range is smaller than movement to the first predetermined range.

19. A motion compensation device to compensate for movement of an optical system of a camera, comprising:

a motion detection unit to detect motion of the optical system;

a drive unit to drive a motion compensation lens in response to the detected motion;

a stopping position detection unit to detect a stopping position of the motion compensation lens;

a centering operation unit to move the motion compensation lens from the stopping position to a first range about an optical axis or a second range greater than the first range about the optical axis;

a range selection unit to select the first range or the second range;

a mode selection unit to select between a one-frame photographic mode and a continuous photographic mode, wherein the first range is selected by said range selection unit during the one-frame photographic mode before execution of each frame of photography, and wherein the first range is selected by said range selection unit during the continuous photographic mode before execution of a first frame of photography and the second range is selected by said range selection unit before execution of subsequent frames of photography to the first.

20. A motion compensation device to compensate for detected motion of an optical system and to control a stopping position of a motion compensation lens with respect to a predetermined range, comprising:

means for moving the motion compensation lens in response to the detected motion; and means for moving the motion compensation lens from the stopping position to a position within the predetermined range if the stopping position is outside the predetermined range.

21. A motion compensation device disposed within a camera, comprising:

a motion compensation unit to move a motion compensation lens in response to detected motion; and a control unit to move the motion compensation lens from a stopping position to a position within a predetermined range if the stopping position is outside the predetermined range.

22. A device disposed between an exterior lens and camera shutter vanes, comprising:

a motion compensation unit to move a motion compensation lens in response to detected motion; and a control unit to move the motion compensation lens from a stopping position to a position within a predetermined range if the stopping position is outside the predetermined range.

23. A camera, comprising:

an exterior lens disposed along an optical axis;

camera shutter vanes which move to expose a camera film plane along the optical axis;

a motion detector to detect motion of the camera;

a motion compensation lens disposed along the optical axis and moving in response to the detected motion;

a motion compensation unit to move the motion compensation lens; and a control unit to move the motion compensation lens from a stopping position to a position within a predetermined range if the stopping position is outside the predetermined range.

* * * * *